April 30, 1968   J. W. BARNES ET AL   3,381,133
SCANNING DEVICE FOR TRACKER USING CONCENTRIC PHOTOSENSITIVE
SURFACES COOPERATING WITH OSCILLATED IMAGE
Filed April 19, 1963

INVENTORS
JOHN W. BARNES
JOHN L. GOODLET, JR.
BY
OSTROLENK, FABER, GERB & SOFFEN
ATTORNEYS

United States Patent Office 3,381,133
Patented Apr. 30, 1968

3,381,133
SCANNING DEVICE FOR TRACKER USING CONCENTRIC PHOTOSENSITIVE SURFACES COOPERATING WITH OSCILLATED IMAGE
John W. Barnes, Floral Park, and John L. Goodlet, Jr., Jackson Heights, N.Y., assignors to Kolisman Instrument Corporation, New York, N.Y., a corporation of New York
Filed Apr. 19, 1963, Ser. No. 274,072
9 Claims. (Cl. 250—203)

Our invention relates to a novel solid state sensor, and more specifically relates to a solid state sensor for use in an optical tracking system such as a star tracker.

Star trackers are well known to the art wherein an optical system produces an image of an object to be tracked with appropriate scanning means operating upon the image of the object being tracked to generate correction signals to maintain a telescope aligned with the tracked object.

In the past, the image of the scanned object being tracked was applied to a photomultiplier which generated appropriate corrective signals or error signals for a servo system. Photomultipliers, however, are relatively noisy when used in a star tracking system during the daytime.

The principle of the present invention is to provide a novel solid state type of photosensitive device which provides improved star detection in the daytime wherein both devices are essentially shot noise limited. However, when using solid state sensors, the problem remains, particularly during use in the daytime, of background gradients which will produce false signals as well as high background noise.

The principle of the present invention is to provide a novel solid state sensor arrangement which inherently cancels out the component of the signal due to background gradient. The gradient at the focal plane consists of two components, (a) A gradient which is a normal characteristic of the daylight sky or other background under consideration;

(b) A gradient which is characteristic of the optical system and is caused by the symmetrical attenuation of light around the optical axis, wherein the brightness falls off approximately as the fourth power of the cosine of the angle between the optical axis and the line of sight.

Thus, in accordance with the invention, a novel solid state sensor is provided with two concentric photosensitive areas which are radially spaced from one another and located symmetrically about the optical axis. The central portion has an area which is relatively small with respect to the outer ring portion. The outputs of the two photosensitive areas are then connected with opposed polarities, and the output is so adjusted that with the same light background or gradient falling upon the two photosensitive areas, their outputs are exactly canceled out. If now, the image of a star or similar object which is to be tracked is oscillated with respect to these two concentric areas, when the star image is in the central and relatively small area surface, it will cause a relatively large change in output of this central area. However, as the star image moves into the outer ring portion, the area of the star image is relatively small with respect to the large sensitive area of the outer ring so that the change in output of the outer ring is relatively small. Thus, a relatively large output signal is obtained from the opposed polarity-connected photo-sensitive surfaces which indicates the presence of the star and its position with respect to an axis of the system, as determined by the phase relationship of the output signal with respect to the phase of the oscillating or scanning means.

Accordingly, a primary object of this invention is to provide a novel solid state sensor for optical tracking systems.

A further object of this invention is to provide a light-sensing means for optical tracking devices which has a high signal-to-noise ratio output.

A further object of this invention is to provide a novel light-sensing device for optical tracking systems which can operate with severe background gradients during the daytime.

Another object of this invention is to provide a novel photosensitive structure for optical tracking systems in which background gradient signals are canceled out within the device.

These and other objects of this invention will become apparent from the following description when taken in connection with the drawings, in which.

Figure 1:
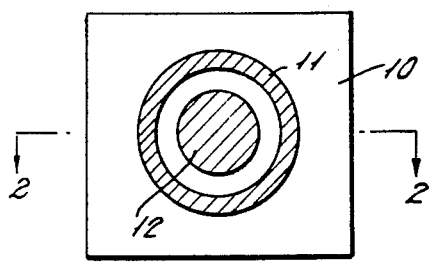
FIGURE 1 shows a top plan view of a solid state sensor constructed in accordance with the invention.
Figure 4:
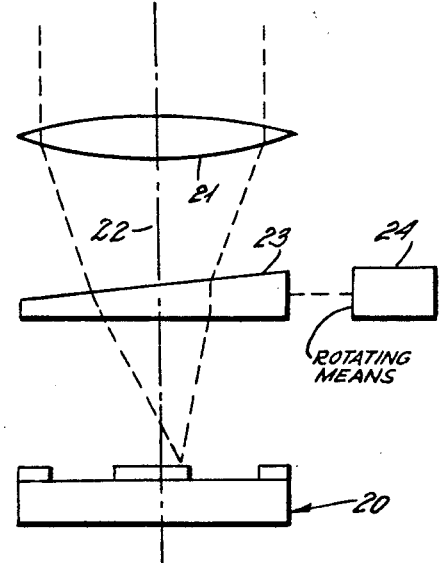
Figure 2:
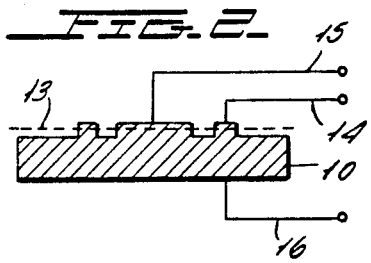
FIGURE 2 is a cross-sectional view of FIGURE 1 when taken across the lines 2—2 in FIGURE 1.
Figure 3:
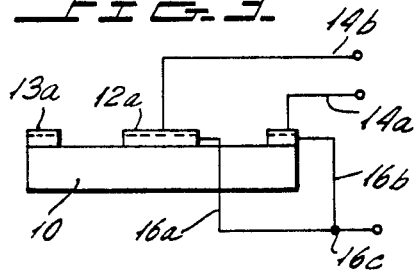
FIGURE 3 illustrates a schematic cross-sectional view of FIGURE 1 for a solid state sensor constructed according to a different method than that of FIGURES 1 and 2.

FIGURE 4 schematically illustrates the optical system used with the sensor of FIGURE 1, 2 or 3.

Figure 5:
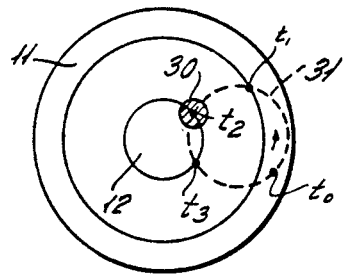

FIGURE 5 schematically illustrates the manner in which the image of a star is rotated with respect to the photosensitive areas of the novel light tracking device.

Figure 6:
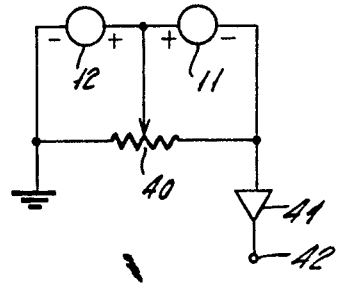

FIGURE 6 illustrates the manner in which the photosensitive areas are connected to one another.

Figure 7:
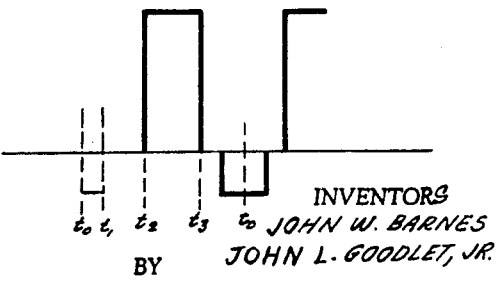

FIGURE 7 schematically illustrates the manner in which the outputs of the photosensitive areas of FIGURE 5 vary as the star image is oscillated.

Referring first to FIGURES 1 and 2, I have illustrated therein a novel cell construction wherein a photosensitive cell is formed of a main body 10 having photosensitive areas 11 and 12 on the surface thereof. A suitable cell has been formed by starting with a standard size .05 inch x .05 inch P or N diffused silicon wafer. The depth of diffusion is approximately equal to the wavelength of the incident light.

Thereafter, and by suitable etching techniques, the photosensitive surface of the cell was etched away, with the exception of ring 11 and disc 12. The disc 12 has a diameter of 0.005 inch, while ring 11 has an inside diameter of 0.009 inch and an outside diameter of 0.020 inch.

It is to be noted, as illustrated in FIGURE 2, that the etching is made sufficiently deep to pass beyond the p-n junction in the cell surface which is at a height indicated by the dotted line 13 in FIGURE 2.

Appropriate electrical connections schematically illustrated by leads 14 and 15 are then made to areas 11 and 12 respectively with a further connection 16 being made to the normal electrode at the base of the cell.

It is to be specifically understood that the method of making the cell is unimportant to the invention, it only being necessary that a photosensitive configuration which has a disc and a concentric frame be formed. Thus, the method of forming the cell could include, as illustrated in FIGURE 3, the formation of a first cell 12a as a disc and a second complete cell 13a as a ring where the two are then soldered to an appropriate base plate 10a. Respective leads, such as leads 16a and 16b, which are connected together at junction 16c, are then made to the normal cell leads, while similar leads 14a and 14b are applied to the sensitive surfaces of elements 13a and 12a respectively.

Another technique which could be utilized in forming the cell could be the use of selective diffusion techniques on a high resistivity substrate with masks being used to provide the ultimate desired shape of the diffused photosensitive areas.

The mounting of the device in a casing is also a matter which would be apparent to those skilled in the art, it being important to observe that the connections made to the photosensitive surface areas should be as thin as possible to minimize interference with incident light.

Thus, it has been found that the silicon cell formed in any desired manner can be welded to a gold base support with gold wire whiskers having a thickness of the order of 0.0005 inch being secured from studs at the sides of the cell to the respective photosensitive areas. The complete device can be thereafter sealed in a dry nitrogen gas atmosphere and enclosed with a transparent window. Alternatively, the surface of the cell could be appropriately passivated after its preparation to avoid the need for the inert atmosphere.

The manner in which the cell is used in an optical tracking system is illustrated in FIGURE 4 where the cell 20 is of the type shown in FIGURES 1 through 3, and is placed in the focal plane of a telescope objective system, schematically illustrated by lens 21. Thus, the telescope system 21 having an optical axis 22 will gather the light from an object which is to be tracked. The cell 20 is centered on the optical axis 22, as illustrated in FIGURE 4, and an appropriate scanning means such as the optical wedge 23 which is rotated about axis 22 by rotating means 24, causes the image of the object being tracked to oscillate about the surface of cell 20.

By way of example, FIGURE 5 illustrates the image 30 of a star being oscillated around the dotted line circle 31 by the rotating wedge 23 where the image is displaced to the right of the optical axis of the system.

In a typical optical tracking system, the image 30 will oscillate at a frequency of about 30 cycles per second.

In order to utilize the cell to obtain position information, the area 12 is connected in opposing polarity relationship with respect to area 11, as schematically illustrated by the polarity signs in FIGURE 6. The two cells are then connected through a balancing potentiometer 40 with the output of the system being applied to appropriate amplifier means 41, and then to a terminal 42 which can be connected to appropriate servo means, or any other desired output means which utilizes the positional information generated.

Assuming first that there is no star signal and that the telescope looks only at a background gradient or background light, the relative outputs of cell portions 11 and 12 are appropriately adjusted in potentiometer 40 to exactly nullify one another. If now, a star image or other object image comes within the telescope field of view, it will be focused, as illustrated in FIGURE 5, in the plane of the photosensitive surface of cell 20 of FIGURE 3, and will be oscillated by the rotating wedge 23, as shown in the dotted lines 31 in FIGURE 5.

The area of the image 30 will be relatively large with respect to the central photosensitive disc 12. Therefore, when the image overlies area 12, the output of area 12 will be greatly increased. However, the area of image 30 is relatively small with respect to the area of ring 11, whereby when the image sweeps through ring 11, it will cause only a slight change in the output of ring 11.

The output of cell portions 11 and 12 is illustrated in FIGURE 7 as a function of time for the oscillation of image 30 of FIGURE 5. Thus, assuming that the timing interval starts at position $t_0$, when the image 30 lies on ring 11, it will be seen that the ring 11 generates a small output with respect to ground potential so that a small negative output signal is applied to amplifier 41. This signal lasts until the image reaches time $t_1$, when the image traverses through the non-photosensitive area between ring 11 and disc 12 whereupon the signal with respect to ground drops back to zero.

Finally, iamge 30 at time $t_2$ reaches disc 12 whereupon a relatively large change in output of disc 12 occurs with respect to ground, as shown in FIGURE 7. It is to be noted that the relative magnitudes of the output due to incident light on disc 12 and the output of ring 11 can be of the order of 10 to 1, or greater.

Finally, at time $t_3$, the star image leaves disc 12 so that the output applied to amplifier 41 drops back to zero.

It will be readily understood that if the center of circle 31 were to shift, the phase relationship of the generated output signal of FIGURE 7 will shift with respect to the phase of the rotating wedge 23. This phase information can then be utilized in any desired manner to determine the displacement of the star image from the axis of telescope 22 to cause appropriate corrective servo systems to change the angle of the telescope to retain the image being tracked directly on the telescope optical axis.

Although we have described preferred embodiments of our novel invention, many variations and modifications will now be obvious to those skilled in the art, and we prefer therefore to be limited not by the specific disclosure herein but only by the appended claims.

The embodiments of the invention in which an exclusive privilege or property is claimed are defined as follows:

1. In a radiation source tracking device; means for producing an image of a radiation source to be tracked, scanning means for circularly oscillating said image in a predetermined plane, and photovoltaic radiation sensing means positioned for receiving said image oscillated by said oscillating means; said sensing means including a first and second radiation sensitive surface; said first surface having an area greater than said second surface; the outputs of said first and second areas being connected in opposed polarities.

2. The device of claim 1 wherein said first and second surfaces are concentric with one another and are radially displaced from one another.

3. The device of claim 2 wherein said first and second areas have their centers on the axis of said means for producing an image.

4. In a radiation source tracking device; means for producing an image of a radiation source to be tracked, scanning means for circularly oscillating said image in a predetermined plane, and photovoltaic radiation sensing means positioned for receiving said image oscillated by said oscillating means; said sensing means including a first and second radiation sensitive surface; said first surface having an area greater than said second surface; the outputs of said first and second areas being connected in opposed polarities; the relative outputs of said first and second surfaces being adjusted to have substantially zero output when said image producing means is not focused on a radiation source to be tracked.

5. The device of claim 4 wherein the field of view is determined by the dimensions of one of the said sensitive areas.

6. The device of claim 4 wherein said first and second surfaces are concentric with one another and area radially displaced from one another.

7. The device of claim 6 wherein said first and second areas have their centers on the axis of said means for producing an image.

8. A light tracking device for tracking a light source comprising a telescope objective for producing an image of said light source; a transparent optical wedge; motor means for rotating said optical wedge about a central axis generally perpendicular thereto; and photocell means having first and second spaced and insulated photosensitive surfaces; said telescope objective having an optical axis; said optical axis of said telescope objective being colinear with said central axis of said optical wedge; said first and second photocell surfaces being positioned in the focal plane of said telescope objective and centered on said optical axis of said telescope objective; said first surface having an area greater than said second surface; the outputs of said first and second areas being connetced in opposed polarities; said optical wedge having a wedge angle sufficient to refract light passing therethrough through a lateral excursion of at least a distance equal to the lateral spacing of said first and second surfaces.

9. The device of claim 8 wherein said first and second surfaces are concentric with one another and are radially spaced from one another; the relative outputs of said first and second surfaces being adjusted to have substantially zero output when said telescope objective means is not focused on a radiation source to be tracked.

References Cited

UNITED STATES PATENTS

| | | | |
|---|---|---|---|
| 2,629,800 | 2/1953 | Pearson | 250—211.1 |
| 2,668,184 | 2/1954 | Taylor et al. | 250—211 X |
| 2,672,528 | 3/1954 | Shockley | 250—211.1 |
| 2,794,917 | 6/1957 | Shockley | 250—211.1 |
| 2,961,542 | 11/1960 | Cartwright et al. | 250—83 |
| 3,076,949 | 2/1963 | Anderson | 250—211 X |
| 3,107,302 | 10/1963 | Coleman | 250—211 |
| 3,117,231 | 1/1964 | Haynes | 250—203 |
| 3,161,375 | 12/1964 | Ruhge | 250—211 |
| 3,218,909 | 11/1965 | Fain | 250—211 X |
| 3,229,102 | 1/1966 | Spencer et al. | 250—211 X |
| 3,244,887 | 4/1966 | Lozins | 250—203 |
| 3,259,751 | 7/1966 | Sachs | 250—203 X |
| 3,268,185 | 8/1966 | Eckermann | 250—203 X |

RALPH G. NILSON, *Primary Examiner.*

E. STRICKLAND, M. A. LEAVITT,
*Assistant Examiners.*